United States Patent Office 3,553,000

Patented Jan. 5, 1971

3,553,000

PROCESS FOR DURABLY SETTING A DESIRED CONFIGURATION IN A CELLULOSIC MATERIAL

Carlo Piazza, Naperville, Ill., assignor to Deering Milliken Research Corporation, Spartanburg, S.C., a corporation of South Carolina No Drawing. Continuation-in-part of application Ser. No. 493,867, Oct. 7, 1965. This application July 1, 1969, Ser. No. 838,336

Int. Cl. C08f *1/22;* D06m *13/40*

U.S. Cl. 117—93.1 5 Claims

ABSTRACT OF THE DISCLOSURE

A process for durably setting a desired configuration in a cellulosic material in which a corona polymerizable material having functional groups reactive with cellulose hydroxy groups is applied to the material and corona polymerized. The material is then placed in the desired configuration and a reaction is initiated between the cellulose hydroxy groups and the above mentioned reactive functional groups.

This application is a continuation-in-part of copending application Ser. No. 493,867 filed Oct. 7, 1965, now abandoned.

This invention relates to the corona discharge induced polymerization and/or grafting of organic monomers on a substrate and more specifically on a textile substrate.

The use of a "glow discharge" or low voltage discharge induced polymerization of vapor phase monomeric materials on a substrate is a well recognized procedure, such a method being disclosed in U.S. Pat. No. 3,068,510. The use of a "corona discharge" or high voltage discharge to produce polymerization of polymeric material is also known, the process being disclosed in U.S. Pat. No. 1,585,573. The corona discharge employed in the patented process is for the simple polymerization of vapor phase materials and not for the polymeric impregnation or coating of a substrate. The use of corona type discharges on treated substrates while known (U.S. Pat. No. 1,557,730) have been avoided due to the arcing or point discharge inherent in the corona type discharge. Arcing or point discharge will frequently result in severe burning of a flammable substrate such as a textile substrate. Apparently the desire to utilize low voltage or glow type discharge and the resultant homogeneous discharge has resulted in the use of vacuum conditions and therefore a consequent use of vapor phase monomeric coating materials.

It is readily apparent that the elimination of vacuum conditions would result in a less expensive and more manageable process as well as process which would lend itself to continuous operation and to the use of monomeric materials which need not be in the vapor phase, that is to say solutions of monomeric materials.

It is therefore an object of this invention to provide a polymerization coating and impregnation process which is carried out at atmospheric pressures utilizing a corona discharge.

It is an additional object of this invention to provide a polymerization coating and impregnation process which is carried out at atmospheric pressures utilizing a corona discharge and a monomeric coating solution.

It is another object of this invention to provide a treated substrate wherein the substrate is treated with a corona discharge produced polymerization product.

It is still another object of this invention to provide a graft polymerized textile product by means of a process which is carried out on a monomeric solution impregnated textile product at atmospheric pressures utilizing a corona discharge.

In accordance with this invention, it has now been discovered that a substrate may be coated by means of polymerizing or grafting a monomeric material on said substrate, said polymerization or grafting being induced by subjecting the substrate in the presence of an organic monomer to a corona discharge at atmospheric conditions employing voltages in excess of 5 kilovolts and frequencies of at least 20 cycles per second, the substrate being shielded with a dielectric while being subjected to the corona discharge. The shield is preferably a composite dielectric shield.

The composite dielectric envelope serves to distribute the corona discharge and prevent localized arcing and accompanying burning of the substrate. The dielectric shield may be either an inorganic or an organic dielectric. Inorganic dielectric materials such as glass which are slightly conductive appear to have the greatest resistance to corona discharge. It is preferred, however, that an organic dielectric be employed and still more preferably an organic dielectric selected from the molecularly oriented film category such as, for instance, polyethylene terephthalate and Teflon (fluorinated polymer marketed by E. I. du Pont de Nemours and Company). Still more preferably the dielectric is composed of alternating layers of different types of dielectric materials. If the dielectric material is a molecularly oriented film, it is prepared so as to be composed of a plurality of layers of film having in intermediate air space of substantially lesser thickness than the film thickness.

The preferred composite dielectric for purposes of this invention is composed of polyethylene terephthalate and Teflon film arranged so as to produce a stack of about 15 mils high with a plurality of air spaces disposed between successive layers of film. The innerface of each electrode then has a composite dielectric disposed thereon. It is also preferred that the composite dielectric have exposed faces which are perfectly smooth and are in continuous motion so as to prevent the possibility of arcing due to a breakdown of a dielectric caused by local super heating. The apparatus and composite dielectric shield utilized to effect the polymerization is described in more detail in U.S. Pat. No. 3,440,418.

The term "monomeric material" as employed herein is deemed to include polymerizable acetylenic and olefinic monomers. Preferably the chemical composition utilized contains an ethylenically unsaturated vinyl or substituted vinyl grouping and at least one other group selected from the group consisting of hydroxy groups and amino groups.

The most convenient, readily available compounds containing groups which polymerize under corona discharge initiation are the vinyl or substituted vinyl compounds having the formula $CHR^4{=}CR^3—$, wherein $R^3$ is selected from hydrogen and methyl and $R^4$ is selected from hydrogen and lower alkyl (preferably, containing one to four carbon atoms). The preferred compounds for use in accordance with this invention contain this group, preferably as $$CH_2{=}CH— \text{ or } CH_2{=}\overset{\displaystyle CH_3}{\overset{|}{C}}—$$

in combination with one of the following acid or base reactive groups, preferably directly adjacent thereto for increased reactivity.

The acid reactive groups are generally those found in the textile resins presently employed in the resin treatment of cellulosic fabrics, e.g., methylol, epoxy, acetal, alkylated methylol, aldehyde,

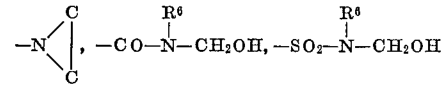

wherein $R^6$ is hydrogen or alkyl, $-N{=}C{=}O$, $-N{=}C{=}S$ and the like. These groups are characterized by their ability to combine with hydroxy groups of the cellulose molecule under textile resin curing conditions.

The base-reactive groups are those which have the capacity of reacting with hydroxy groups of the cellulose molecule in the presence of strong base at elevated temperatures and include epoxy and halohydrin groups, and carbonyl, acetylenic, sulfone and sulfoxide activated groups, e.g., of the formula $CHR^4{=}CR^3{-}A{-}A'$ wherein A is a carbonyl, sulfone, sulfoxide or acetylenic group and A' is sulfatoethyl, alkali-metal sulfatoethyl, phosphatoethyl, alkali-metal phosphatoethyl, thiosulfatoethyl and alkali-metal thiosulfatoethyl, quaternary ammonium ethyl halides, e.g., pyridinium ethyl chloride, vinyl or substituted, e.g., lower alkyl vinyl, sulfonhalide, such as sulfonfluoride.

Typical compounds having both a polymerizable group and a group reactive with hydroxy groups of cellulose include those having the following formulae:

(I)

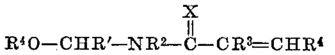

and wherein R' is selected from hydrogen, lower alkyl, and the residue of an aldehyde; $R^2$ is selected from hydrogen, lower alkyl, and $-CX{-}CR^3{=}CH_2$; $R^3$ is selected from hydrogen and methyl; $R^4$ is selected from hydrogen and lower alkyl; and X is selected from sulfur and oxygen.

Additional suitable compounds include imides, such as (II)

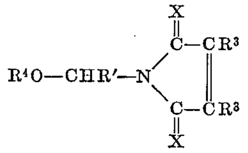

(III)

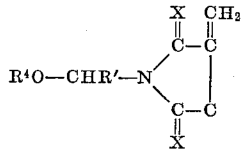

and the like; vinyl sulfonamides, such as (IV)

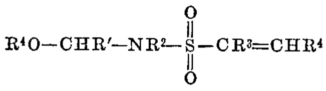

and the like, wherein $R^1$, $R^2$, $R^3$, $R^4$ and X are as defined above. The

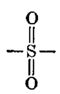

can have substituted therefor

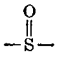

and sulfonium if desired.

In any of the compounds shown herein, particularly those characterized by Formula I above, the

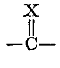

groups have substituted therefor

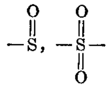

and sulfonium if desired. Additional compounds include anhydrides, such as (V)

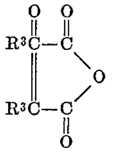

Preferred compounds characterized above are the methylol acrylamides, e.g.,

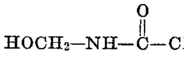 (N-methylolacrylamide)

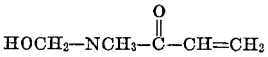 (N-methylol-N-methylacrylamide)

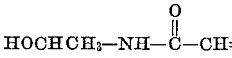 (N-methylmethylolacrylamide)

and

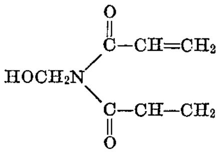

the methylol groups of which are reactive with the hydroxy groups of cellulose under textile resin curing conditions, as with an acid-acting catalyst at elevated temperatures, e.g., from 140° to 200° C., the $CHR^4{=}CR^3$ and groups being polymerizable and reactive with cellulose under the influence of irradiation.

Additional suitable methylol acrylamides include those having more than one methylol group, such as shown in the following formulae:

(VI)

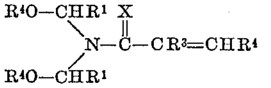

wherein $R^1$ is selected from hydrogen, lower alkyl and the residue of an aldehyde; $R^3$ is selected from hydrogen and methyl; $R^4$ is selected from hydrogen and lower alkyl; and X is selected from oxygen and sulfur.

Other acrylamide compounds may be utilized, e.g., alkylene-bis-acrylamides to provide compounds of the following formulae:

(VII)

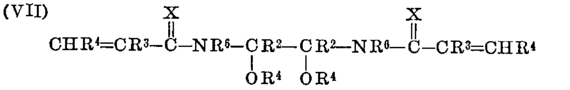

wherein $R^3$, $R^4$ and X are as before, $R^6$ being hydrogen, lower alkyl or $CHR^1OR^4$ wherein $R^1$ is as before. Typical compounds include that derived from acrylamide and glyoxal (wherein $R^3$, $R^4$ and $R^6$ are hydrogen and X is oxygen) and the N-methylol, di-N-methylol derivatives thereof.

(VIII)

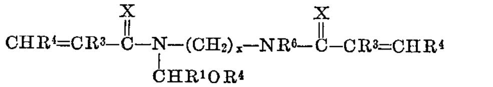

wherein $R^3$, $R^4$, $R^6$ and X are as before, and $x$=1–6, e.g., N-methylol-methylene-bis-(acrylamide), methylene-bis-(N-methylol acrylamide) and the like.

(IX)

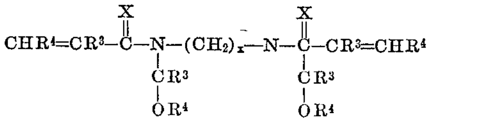

as derived from methylene-bis-acrylamide and glyoxal and the like.

In the above compounds, in a less preferred embodiment, the

groups can have substituted therefor

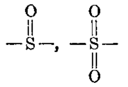

and sulfonium groups.

In preparing the above compounds, aldehydes other than formaldehyde may be utilized, for example, those derived from aldehydes wherein $R^1$ in the formulae above would be lower alkyl, e.g., acetaldehyde; acetyl, e.g., pyruvaldehyde; $OCH(CH_2)_n$ wherein $n$ equals 0 to 4, e.g., glyoxal ($n=1$); $OCH(CH_2)_3CHOH$—, e.g., hydroxy adepaldehyde and the like.

Other suitable compounds are the hemiacetals and full acetals, such as acrolein, methacrolein, crotonaldehyde and the like; methylol derivatives of hydrazides, hydrazines and the like, such as acrylic hydrazide, dimethylol-acryl-s-triazine and the like; acryloyl-methylol-cyclic-ethyleneurea compounds, such as N-[β-(methacryloyloxy-acetamide)ethyl]-N,N′-methylol-ethyleneurea and the like; vinyl ethyleneimino compounds, such as vinyloxyalkyl-ethylene urea and the like; unsaturated glycidyl ethers such as allyl glycidyl ethers, butadiene monoepoxide and the like; methylol diallyl urea; isocyanatovinyl ethers, such as those described in Chemical Abstracts, 1957, vol. 51, citation 15176e; vinyl haloalkyl ethers such as vinyl chloromethyl ether, vinyl chloroethyl ether and the like; vinyl haloalkyl ketones, such as vinyl chloromethyl ketone, vinyl chloroethyl ketone and the like; halogenated vinyl triazines, such as 2,4-dichloro-6-vinyl-1,3,5-triazine and the like; acrylamidoalkyl pyridinium halides, such as acrylamidomethyl pyridinium chloride and the like; organic vinyl thiosulfates of the formula:

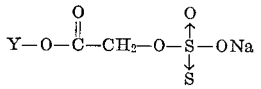

wherein Y contains at least one vinyl group; methylol derivatives of vinyl carbamates and thiocarbamates, such as methyl allyl carbamate and thiocarbamate and the like; vinyl carbamyl halides, such as vinyl carbamyl chloride and the like; vinyl thiocarbamyl halides, such as vinyl thiocarbamyl chloride and the like; vinyl carbonyl azides of the formula

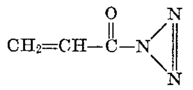

α-methylol vinyl alkyl ketones, such as α-methylol vinyl methyl ketone; methylol-vinyl-sulfonamides; haloethyl acrylamides and the like.

As previously mentioned, the invention as set forth herein is suitable for a formation of a polymerized homopolymer upon any substrate as well as the grafting of a monomer upon a reactive substrate. The grafting of monomers upon a substrate has been found to be especially suitable for textile substrates such as, for instance, cotton fabrics. If desired, a presensitized cellulosic material may be prepared by grafting a monomeric material to the cellulosic material by means of a carbon-to-carbon type linkage which is induced by the corona discharge.

By following the process of this invention, there is provided a novel polymeric composition of matter characterized by the formula:

$$P—R—P'$$

wherein P represents a polymeric substrate, R represents a polymeric connecting group which is connected to P through a carbon-to-carbon linkage and to P′ through an ether linkage and P′ represents a monomeric or polymeric modifier or a polymeric substrate. If the polymeric substrate treated in accordance with this invention is a cellulosic material, both P and P′ represent the same polymeric substrate, although one of the preferred embodiments of the present invention is to utilize the process set forth hereinafter in the treatment of blends of synthetic polymeric fibers with cellulosic fibers. In this instance, in addition to crosslinked cellulose, there is provided a polymeric coating on the synthetic substrate which coating is reacted with the substrate through a carbon-to-carbon linkage and further reacted to any available cellulosic component through an ether linkage.

Such products are obtained in accordance with the process of the present invention by applying to cellulosic materials, including blends of cellulosic fibers with synthetic polymeric fibers, a chemical composition having at least one group which polymerizes under the influence of corona discharge and at least one other group reactive with hydroxy groups of cellulose under catalyzed conditions; subjecting said material to irradiation whereby said composition polymerizes and reacts through a carbon-to-carbon linkage with the cellulosic material; placing the material in the desired configuration, for example, in the form of a creased garment; and then initiating the reaction of said other group with hydroxy groups of cellulose to set the material in the desired configuration. Preferably, the chemical composition utilized contains an ethylenically unsaturated vinyl or substituted vinyl grouping and at least one other group reactive with hydroxy groups of cellulose under conventional acid or base catalysis.

One means for achieving the desired result is to apply to cellulosic material a chemical composition having at least one ethylenically unsaturated grouping and another group reactive with formaldehyde to form a methylol group, including, of course, compounds reactive with other aldehydes to form other derivatives thereof; subjecting said fabric to corona discharge whereby said composition polymerizes and becomes chemically bonded to said cellulosic materials through a carbon-to-carbon linkage; reacting the thus formed material with aldehyde to form terminal groups reactive with hydroxy groups of cellulose; placing said material in a desired configuration and initiating the reaction of said terminal groups with hydroxy groups of cellulose to said material in the desired configuration.

In another process within the scope of the present invention, synthetic polymeric compositions are treated with one of the chemical compositions set forth above containing a group which polymerizes under the influence of corona discharge and another group which is reactive with hydroxy groups of cellulose, subjecting said polymeric material to corona discharge either in the presence of a chemical modifier is permanently attached to the synthetic polymeric substrate by attachment to the terminal group of the chemical composition grafted onto the polymeric substrate. For example, the preferred terminal group comprises methylol. Any chemical compound reacting with methylol, for example, active hydrogen-containing compounds, could be permanently attached to the polymeric substrate via the grafted connecting group. Typical compounds are those having an active hydrogen atom connected to oxygen, nitrogen, sulfur and the like, including amines, amides, alkanolamines, alcohols, thiols and the like, particularly cellulosic modifiers or alcohols, such as hydroxyalkyl cellulose, for example, hydroxyethyl cellulose; carboxylated alkyl cellulose containing free hydroxy groups, for example, carboxymethyl cellulose, and the like. In instances when the terminal group compresses an epoxide group, carboxylic acids, in addition to the above classes of compounds, can be utilized.

The catalyst useful in activating the acid or base reactive groups are those conventionally used to activate the reaction of textile resins containing the same group for reaction with hydroxy groups of cellulose. Preferably, latent acid or base acting catalysts are utilized, that is compounds which are acidic or basic in character under the curing conditions. The most common acid acting catalysts are the metal salts, for example, magnesium chloride, zinc nitrate and zinc fluoroborate and the amino salts, for example, monoethanolamine hydrochloride and 2-amine-2-methyl-propanol nitrate.

The base acting catalyst preferably is a compound which does not initiate substantial reaction between the base reactive group and hydroxy groups of cellulose under normal conditions, but does initiate substantial reaction under prescribed conditions, such as elevated temperature or some other activating means, as through use of another chemical compound. For example, an alkali metal sulfite can be padded onto the fabric and be decomposed into strongly basic alkali metal hydroxide by including small amounts of formaldehyde in the stream used for curing.

The latent base acting catalyst utilized herein preferably comprises alkaline earth salts, such as alkaline metal carbonates like sodium carbonate, which is neutral to mildly alkaline, for example pH of about 8.5 on the fabric but decomposes at temperatures in excess of about 80° C. to form the stronger base sodium carbonate, which will initiate substantial reaction at the elevated temperatures utilized during curing. Sodium carbonate may be utilized if desired since the pH of 9.5 in the fabric produced by this compound in normal condition is generally insufficient to initiate the desired degree of reaction under normal temperature conditions.

If fabrics containing a base reactive group are maintained at pH levels above about ten, however, degradation occurs, so that an essentially neutral or mildly alkaline catalysts are preferred when base reactive compounds are utilized.

Additional base acting catalysts include potassium bicarbonate, potassium carbonates, sodium silicate, alkali metal phosphates, such as sodium or potassium phosphates, barium carbonate, quaternary ammonium hydroxides and carbonates, for example, lauryl trimethyl ammonium hydroxides and carbonates and the like.

The amount of catalyst to be utilized is that conventionally used in activating the reaction between textile resins and hydroxy groups of cellulose, for example, up to about 20% by weight of an acid acting compound with the preferred range being from about 5% to about 10%. A preferred range for the base acting catalyst is again the conventional amount and is generally between about 0.2% to about 16%, preferably about 2 to 16%.

The amount of catalyst to be utilized will depend in part on the temperature at which the reaction is conducted and the amount of catalyst consumed in the reaction. For example, when base catalyst are utilized, if a highly acidic group is released during the reaction, the amount of base applied to the textile material should be at least sufficient to provide an excess of base in addition to that which is consumed by the highly acidic group.

One of the advantages of the process of this invention is that the catalyst can be applied to the material being treated at the same time as the presensitizing or connecting chemical, since corona discharge has no effect on the catalyzed groups, e.g., methylol. In a preferred embodiment of the present invention, an aqueous solution, containing a methylol derivative of acrylamide and an acid-acting catalyst is applied to cellulosic fabric. After drying to a moisture level below about 10% by weight, based on the dry fabric, the fabric is subjected to corona discharge polymerization and grafting of the acrylamide compound to the cellulose. The resulting fabric contains terminal methylol groups and the catalyst necessary for reaction with hydroxy groups of cellulose to complete the novel cross-link, namely, a cross-link linked at one end by a carbon-carbon bond and at the other end by an ether linkage. By completing the cross-link while the fabric, preferably in garment form, is held in a desired configuration, the configuration may be durably set into the fabric while simultaneously producing a high level of flat dry characteristics.

The curing conditions utilized for garment curing are those conventionally employed in the reaction of cellulosic materials with textile resins. Under these conditions, the dry fabric is heated to an appropriate temperature, for example, from about 100 to 200° C., preferably about 140 to 190° C., to affix the compound to the textile material.

The term "cellulosic textile material" when used herein means any textile material comprising cellulosic fibers, for example, cotton, paper, linen, jute, flax, regenerated cellulose fibers, including viscose rayon in the form of staple, yarn and fabrcis.

As noted above, one of the preferred embodiments of this invention involves the use of the process of cellulosic materials containing both cellulosic and non-cellulosic fibers, particularly non-cellulosic fibers having minimum care characteristics of their own, for example fabrics formed from a mixture of cellulosic fibers with such synthetic polymeric substrates as polyesters, including poly-(ethylene terephthalate); polyamides, such as poly(hexamethyleneadipimide); acrylic fibers, such as polyacrylonitrile and coploymers containing at least about 85% combined acrylonitrile and the like.

The advantages of the process of the present invention are evident whether the material treated is in the form of fibers, yarns, threads or fabrics although the presensitizing embodiment of this invention is most advantageously conducted on fabrics. Such can be woven, non-woven, knitted, mercerized, printed, dyed or otherwise treated prior to irradiation or thereafter as desired.

Garments made from these fabrics can be produced in the conventional manner with no additional steps required and may be folded and pressed on conventional equipment, for example, a Hoffman press, where activating conditions are produced as a result of the high temperatures utilized. The pressing cycle utilized is standard in the industry and generally involves pressing of the garment for a short period of time, followed by a curing operation in an oven. Alternatively, the garment may be set in a desired configuration under hot dry conditions, such as by hot pressing without steaming, for example, at temperatures up to about 200° C. for as long as necessary to produce the desired results.

It should be understood that the monomeric chemicals employed in this invention may be applied to the substrate as a vapor, as a spray of the liquefied monomer or as a solution of the monomer in a suitable organic solvent or water carrier. The preferred means of application of the monomer is in the form of a solution. Solvents which have been found to be especially suitable for purposes of this invention are solvents selected from the group consisting of formic acid, methylene chloride, trichloroethylene, chloroform, benzene, toluene, dioxane, heptane, butane, ethyl alcohol, acetone, acetic acid, glycerol and ethylene glycol. Water is the preferred solvent.

The following specific examples are given for purposes of illustration and should not be considered as limiting the spirit or scope of this invention.

EXAMPLE I

Four yards of 47 inch all cotton fabric having a construction of 136 x 64 and a weight of 2.67 yards per pound prepared from single 40's yarn in the warp and single 30's yarn in the fillings is padded with a solution comprising 17% N-methylol acrylamide (60% aqueous solution), 7.2% MX (50%), 0.1% N–95 and 3% syn-soft. The padding operation is conducted so that a pickup of about 8% by weight based on the dry weight of the fabric is obtained. The fabric is then passed over dry cans to achieve a substantially air dry condition. The fabric is then subjected to a dielectric shielded corona discharge for a 15 minute period of time at 10 milliamps per 100 square inches employing an alternating current of 120 cycles per second and 15 kilovolts. A 72% conversion of the N-methylol acrylamide by means of a carbon to carbon linkage is found to have been obtained based on the extraction of unreacted acrylamide from the fabric. The fabric thus prepared is a presensitized fabric suitable for the formation of permanent creases upon curing the unreacted component of the resin.

EXAMPLE II

A 65% Dacron/35% cotton fabric having a width of 65.75 inches and a construction of 96 x 80 and a weight of 1.73 yards per pound is padded with the composition of Example I, the padding being carried out so as to produce a pickup of 4% by weight based on the dry weight of the fabric. The dried and padded fabric is then subjected to the same corona discharged treatments as are given in Example I. The finished product is found to have a 76% conversion of N-methylol acrylamide, the percent conversion being based on the extracted monomeric material. The fabric thus prepared is a presensitized fabric suitable for the formation of permanent creases upon curing the heat reactive component of the resin.

EXAMPLE III

A 65% Dacron/35% cotton fabric having a width of 49.75 inches and a construction of 96 x 60 and a weight of 2.11 yards per pound is passed through the pad bath of Example I in a manner so as to produce a pickup of 4% by weight based on the dry weight of the fabric. The padded and dried fabric is then subjected to the corona discharge treatment as given in Example I. The final product is found to have an 83% conversion of N-methylol acrylamide, the percent conversion being based on extracted monomeric material. The fabric thus prepared is a presensitized fabric suitable for the formation of permanent creases upon curing the heat reactive component of the resin.

EXAMPLE IV

An all cotton broadcloth fabric having a 47 inch width and a 136 x 64 construction is prepared from single 40's yarn in the warp and single 30's yarn in the filling with a weight of 2.67 yards per pound is passed into an aqeuous pad bath containing 20% by weight of a 50% aqueous solution of N-N-dimethylolacrylamide (reaction product of 1 mole acrylamide and 2.2 moles of formaldehyde) and 1% by weight Syn-fac 905 (ethoxylated nonylphenol wetting agent marketed by Sylvan Chemical Co.). The padding operation is conducted so as to produce a pickup of about 8% based on the dry weight of the fabric. The padded fabric is then passed over dry cans in order to dry the fabric. The fabric is then subjected to 15 minutes of dielectric shielded corona discharge under atmospheric conditions 120 cycles per second alternating current having a voltage of 16 kilovolts and current density of 10 milliamps per 100 square inch is employed. The percent conversion of N-N-dimethylolacrylamide is found to be about 54.5% the percent conversion being based on extracted monomeric material. The fabric thus prepared is a presensitized fabric suitable for the formation of permanent creases upon curing the heat reactive component of the resin.

EXAMPLE V

The process of Example IV is again repeated with the exception that the pad bath contains a 10% aqueous solution of acrylamide. The finished fabric product is found to have a 69.0% conversion of acrylamide, the percent conversion of acrylamide being based on extracted monomeric material. The final product, which has no heat reactive curable components is a fabric having good flat dry properties.

EXAMPLE VI

The process of Example IV is again repeated with the exception that the pad bath contains a 17% by weight aqueous solution of N-methylol acrylamide. The finished product is found to have a 49.3% conversion of N-methylol acrylamide, the percent conversion being based upon extracted monomeric material. The fabric thus prepared is a presensitized fabric suitable for the formation of permanent creases upon curing the heat reactive component of the resin.

EXAMPLE VII

The procedure of Example IV is again repeated with the exception that the pad bath contains in addition to the other ingredients a 6% by weight aqueous solution of a 50% aqueous solution of $MgCl_2 \cdot 6H_2O$. The final product is found to be a presensitized cotton fabric containing a 60.5% conversion of resin, the percent conversion being based upon extracted monomeric material. The presensitized fabric is suitable for the formation of permanent creases upon curing the heat reactive component of the resin.

EXAMPLE VIII

A 65% polyester/35% cotton fabric having a width of 64.91 inches and a construction of 76 x 44 prepared from single 15's yarn in both the warp and the fill having a weight of 1.36 yards per pound is padded with a solution of N-methylol acrylamide in water. The padding is conducted so as to result in a 5.8% by weight pickup based on the dry weight of the fabric when the N-methylol acrylamide solution is padded onto the fabric. The padded fabric is then dried and subjected to a dielectric shielded corona discharge of 120 cycles per second alternating current employing a voltage of 16 kilovolts and a current density of 10 milliamps per 100 square inches. The corona discharge treatment is carried out for a period of about 15 minutes after which the final product is found to have a 50% conversion to polymeric material, the percent conversion being determined by an extraction of monomeric material from the coated fabric. The fabric thus prepared is a presensitized fabric suitable for the formation of permanent creases upon curing the heat reactive component of the resin.

EXAMPLE IX

The procedure of Example VIII is repeated with the exception that a more concentrated solution of N-methylol acrylamide is prepared so as to produce a pickup of about 8.2% by weight based on the dry weight of the fabric. The corona discharge treated fabric is found to have 72% conversion to polymeric material, the percent conversion being determined by extraction of monomeric material from the padded fabric. The fabric thus prepared is a presensitized fabric suitable for the formation of permanent creases upon curing the heat reactive component of the resin.

That which is claimed is:

1. A process for durably setting a desired configuration in a cellulosic material comprising (a) applying to the cellulosic material a chemical composition containing at least one group which polymerizes under the influence of corona discharge, and at least one other group which reacts with the hydroxy groups of cellulose;

(b) subjecting said material to corona discharge in excess of about 5 kilovolts while said material is shielded by a composite dielectric shield comprising a plurality of layers of dielectric material whereby said composition polymerizes;

(c) placing said material in a desired configuration; and (d) initiating the reaction of said other group with the hydroxy groups of the cellulose to set said material in the desired configuration.

2. The process of claim 1 wherein the chemical composition contains a vinyl or a substituted vinyl group.

3. The process of claim 1 wherein the chemical composition is a methylol acrylamide.

4. The process of claim 3 wherein the acrylamide is N-methylol acrylamide.

5. The product obtained by the process of claim 1.

References Cited

UNITED STATES PATENTS

| | | | |
|---|---|---|---|
| 3,092,512 | 6/1963 | Magat et al. | 117—93.31X |
| 3,140,197 | 7/1964 | Heberlein et al. | 117—93.31 |
| 3,415,683 | 12/1968 | Coffman et al. | 117—93.1X |
| 3,431,137 | 3/1969 | Fadner | 117—93.1 |

OTHER REFERENCES

Coffman et al.: "Scientific America," June 1965, pp. 91–98.

Goodman: "Journal of Polymer Science," vol. 44, No. 144 (1960), pp. 551 and 552.

Wash et al.: "Textile Res. Jour.," July 1965, pp. 648–654.

ALFRED L. LEAVITT, Primary Examiner

J. H. NEWSOME, Assistant Examiner

U.S. Cl. X.R.

8—116.3; 117—139.4, 139.5, 143; 204—165

PO-1050
(5/69)

UNITED STATES PATENT OFFICE
CERTIFICATE OF CORRECTION

Patent No. 3,553,000 Dated January 5, 1971

Inventor(s) Carlo Piazza

It is certified that error appears in the above-identified patent and that said Letters Patent are hereby corrected as shown below:

Column 1, line 55 -- a -- should be inserted between "as" and "process
Column 2, line 32 "in" should be -- an --.
Column 3, formula 3, should appear as follows: 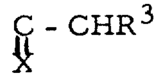
Column 4, formula 4, fifth and last formula should appear as follows: -
Column 4, formula 5, should appear as follows: 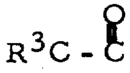
Column 4, formula on line 30 should appear as follows: $C-CH=CH_2$
Column 7, line 19 "stream" should be -- steam --.
Column 8, line 26 "coploymers" should be -- copolymers --.

Signed and sealed this 2nd day of January 1973.

(SEAL)
Attest:

EDWARD M. FLETCHER, JR.
Attesting Officer

ROBERT GOTTSCHALK
Commissioner of Patent